US007258401B2

(12) United States Patent  
Smith

(10) Patent No.: US 7,258,401 B2
(45) Date of Patent: Aug. 21, 2007

(54) PORTABLE CHAIR AND METHOD OF USE THEREOF

(76) Inventor: Wornie Smith, 4447 Greenridge Dr., Columbus, GA (US) 31909

( * ) Notice: Subject to any disclaimer, the term of this patent is extended or adjusted under 35 U.S.C. 154(b) by 0 days.

(21) Appl. No.: 11/268,056

(22) Filed: Nov. 7, 2005

(65) Prior Publication Data

US 2007/0108806 A1    May 17, 2007

(51) Int. Cl.
*A47C 15/00* (2006.01)
(52) U.S. Cl. .................................. 297/463.2
(58) Field of Classification Search ........... 297/452.33, 297/452.13, 217.6, 217.4, 217.3, 45, 4, 17, 297/16.2, 195.11, 197, 195.1, 204, 205, 452.23, 297/273, 452.39, 452.4, DIG. 8, 463.2; 182/100, 182/190, 9; D6/363, 358, 362; 135/73, 135/70, 66, 75
See application file for complete search history.

(56) References Cited

U.S. PATENT DOCUMENTS

| 759,809 | A | * | 5/1904 | Farley ............................ 297/4 |
| 872,739 | A | * | 12/1907 | McDaniel ....................... 297/4 |
| 1,942,112 | A | * | 1/1934 | McQuilkin .................... 297/45 |
| 3,320,413 | A | * | 5/1967 | Mansson ...................... 362/418 |
| 3,858,596 | A | * | 1/1975 | Thomas ........................ 135/69 |
| 4,237,915 | A | * | 12/1980 | Zabielski et al. ............. 135/68 |
| 4,538,854 | A | * | 9/1985 | Wilson ...................... 297/344.2 |
| 4,705,143 | A | * | 11/1987 | Ziemba ....................... 182/187 |
| 4,778,216 | A | * | 10/1988 | Stupakis ....................... 297/17 |
| 4,944,057 | A | * | 7/1990 | Shaw ............................ 5/89.1 |
| 5,351,704 | A | * | 10/1994 | Hunnicutt et al. ............ 135/66 |
| 6,328,131 | B1 | * | 12/2001 | Backus ........................ 182/187 |
| 6,397,868 | B1 | * | 6/2002 | Smith .......................... 135/66 |
| 6,739,670 | B2 | * | 5/2004 | Johnson ................. 297/423.41 |

* cited by examiner

*Primary Examiner*—Milton Nelson, Jr.
(74) *Attorney, Agent, or Firm*—Myers & Kaplan, LLC; Sandra M. Drummond; Barry E. Kaplan

(57) ABSTRACT

A portable chair and method of use thereof, wherein the chair comprises a seating portion, a support pole and a strap that secures the chair to a fixed object, such as a tree or post. The chair further comprises a section of material utilized as a seat, wherein the material at the bottom end of the seat is gathered into fan-folds, and wherein the fan-folds are secured together via a grommet. A telescopic support rod engages the grommet to support the bottom end of the seat, while the strap fastener supports the top end of the seat. Accessories may be attached to the support rod via a threaded facility.

1 Claim, 3 Drawing Sheets

PORTABLE CHAIR AND METHOD OF USE THEREOF

TECHNICAL FIELD

The present invention relates generally to chairs, and more specifically to a portable chair and method of use thereof, wherein the chair may be secured to a vertical post, tree trunk, and the like.

BACKGROUND OF THE INVENTION

Devices for providing a seating surface abound. From simple four-legged chairs to sophisticated swings or couches, innovations in seating technology have taken place throughout the history of mankind. However, most available seating structures are rigid and lack convenient portability, and most existing portable seating devices are cumbersome, heavy and/or bulky, are unsuited for transportation by an individual, and carrying such devices for large distances is quite tiring.

Unfortunately, there are many occasions wherein a single individual may desire to have a chair that can be easily stored, readily carried, and quickly assembled. In particular, hunters and other sporting enthusiasts often desire lightweight seating apparatuses to ease the burden of transport.

For hunters, the large bulk of such prior art devices further prevents utilization where narrow paths between vegetation must be travelled, potentially causing disturbance to the environment that may alert game to the presence of a hunter. Once a suitable location is reached, assembly of such devices is often complex and time consuming, requiring a multitude of components to be assembled before the seating device can be utilized. Additionally, for hunters, slow assembly wastes otherwise precious time during which game could be observed and/or harvested. Complex assembly also disturbs the area of use by creating sound or motion disturbances that may frighten and/or alert game. Further, the surrounding area may be degraded by securing devices, such as nails, that cause transformation of, and/or damage to, the tree or similar, to which the device is attached.

Additionally, sporting enthusiasts who attend local league and/or high school games will often find that they are at a field lacking bleachers or other suitable seats, or will find same to be fully occupied prior to arrival of the sporting enthusiast.

Therefore, it is readily apparent that there is a need for a lightweight, compact portable chair and method of use thereof, wherein the portable chair is readily packed into a slender profile, and wherein the portable chair can be quickly and easily assembled for use.

BRIEF SUMMARY OF THE INVENTION

Briefly described in a preferred embodiment, the present invention overcomes the above-mentioned disadvantages and meets the recognized need for such a portable chair by providing a portable chair and method of use thereof, wherein the chair comprises a seating portion, a support rod and a fastening device, and wherein the fastening device removably secures the chair to a fixed object, such as a tree or post.

The present invention is comprised of readily available, low cost materials. It is lightweight and can be readily disassembled. The light weight facilitates transport, wherein the present invention can be quickly and easily rolled into a compact package that a hunter or sportsman can carry without difficulty.

According to its major aspects and broadly stated, the present invention in its preferred form is a portable chair and method of use thereof, wherein the portable chair comprises a canvas, or similar material, hammock-like seat portion with a telescoping support rod at one end thereof, and a fastening device at the other end thereof. Such a portable chair can be readily transported into the field by a hunter, or to a sporting event by a sportsman, and can be secured to a nearby tree or pole to which the fastening device can be attached.

More specifically, the present invention is a portable chair and method of use thereof, wherein the portable chair comprises a seat of flexible fabric, a support rod and a fastening device to secure the chair to a tree or pole. The fastening device may comprise a rope, strap, tape or other devices, such as a belt and fastener, wherein the fastener is closed by a buckle, cambuckle, snap closure, hook-and-loop fastener, or the like. The fastening device is disposed within a fold of the seat material at the top portion thereof that forms a channel for passage of the means for securing, while the bottom portion of the seat material is formed into fan-folds. The fan-folds are secured together at a common point via a grommet.

The support rod comprises telescopic sections having a locking mechanism. The top end of the support rod is attached to the grommet via a ring fastener that is secured to the support rod at the top section thereof. Additionally, a threaded section at the top of the support rod permits attachment of accessories, such as, for exemplary purposes only, a light, a camera, or communication device.

To assemble, the fastening device is secured around a pole or tree, the top portion of the seat is expanded along the fastening device, and the support rod is attached and positioned near the base of the pole or tree, wherein a person can sits securely and comfortably. Raising or lowering the position of the fastening device around the tree or pole, and/or via adjusting the support rod, changes the posture of the user for comfort.

When it is desired to transport the portable chair, the seat portion can be readily collapsed along the fan folds, and the support rod placed alongside the fabric, and the resulting bundle secured via a rope, belt or other securing device. The support rod can alternately be disengaged prior to securing into a bundle. Once collapsed, the portable chair of the present invention is readily transported and requires minimal space.

Accordingly, a feature and advantage of the present invention is its ability to be quickly assembled and disassembled.

Another feature and advantage of the present invention is its ability to raise or lower the seating position of the user according to the task at hand.

Still another feature and advantage of the present invention is its ability to utilize existing trees and poles for support.

Yet another feature and advantage of the present invention is its light weight and compact construction.

Yet still another feature and advantage of the present invention is that it permits attachment of accessories, such as a camera, light or communications device for ready availability by the user of the portable chair.

A further feature and advantage of the present invention is its ability to be adjusted for comfort.

These and other features and advantages of the present invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Selected Alternate Embodiments with reference to the accompanying drawing figures, in which like reference numerals denote similar structure and refer to like elements throughout, and in which.

DETAILED DESCRIPTION OF THE PREFERRED AND SELECTED ALTERNATIVE EMBODIMENTS

Figure 1:
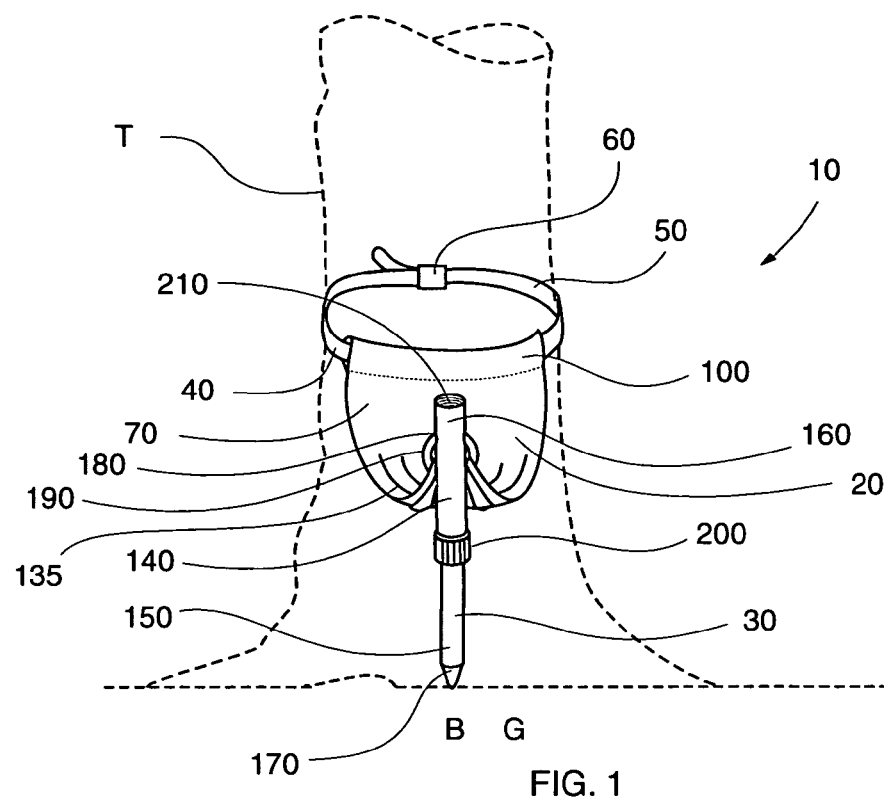
FIG. 1 is a front view of a portable chair according to a preferred embodiment of the present invention.
Figure 2:
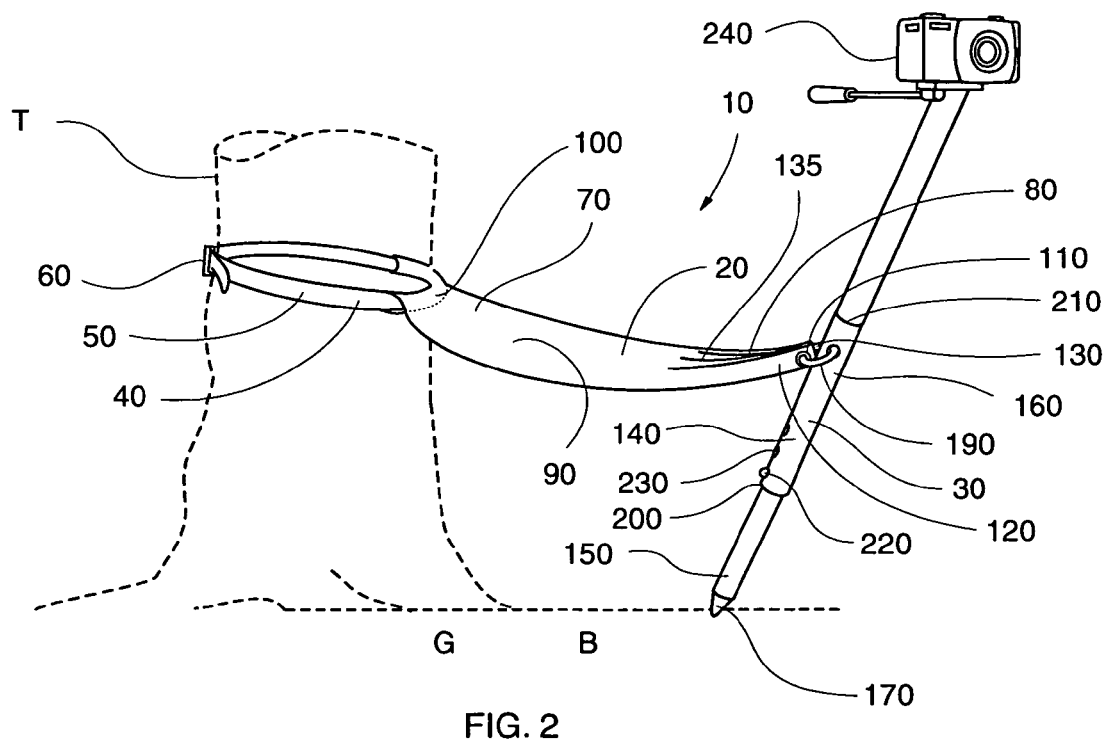
FIG. 2 is a side view of a portable chair according to a preferred embodiment of the present invention.
Figure 3:
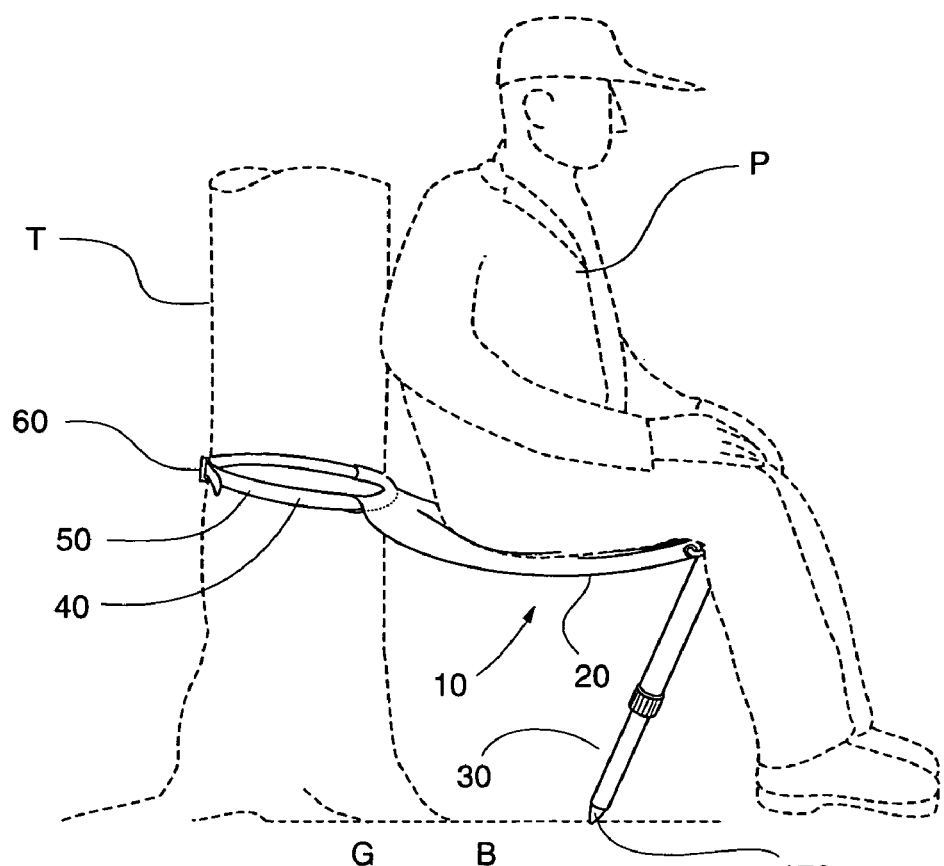
FIG. 3 is a side view of portable chair according to a preferred embodiment of the present invention, shown being used in an elevated position.
Figure 4:
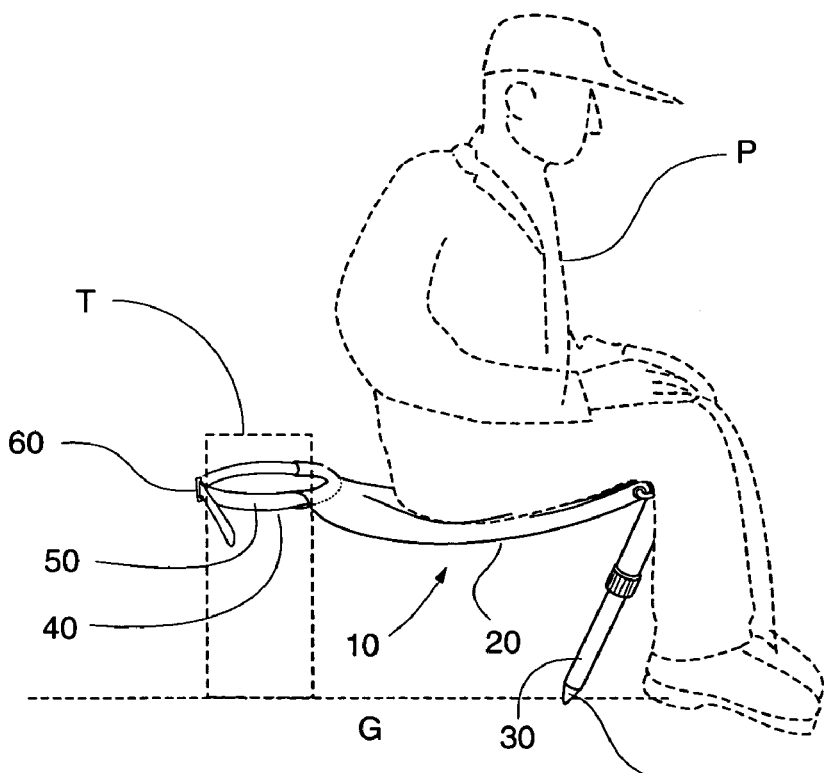
FIG. 4 is a side view of an apparatus according to a preferred embodiment of the present invention, shown being used in a lowered position; and, FIG. 5 is a perspective view of an apparatus according to the present invention, shown bundled for transport and/or storage.
Figure 5:
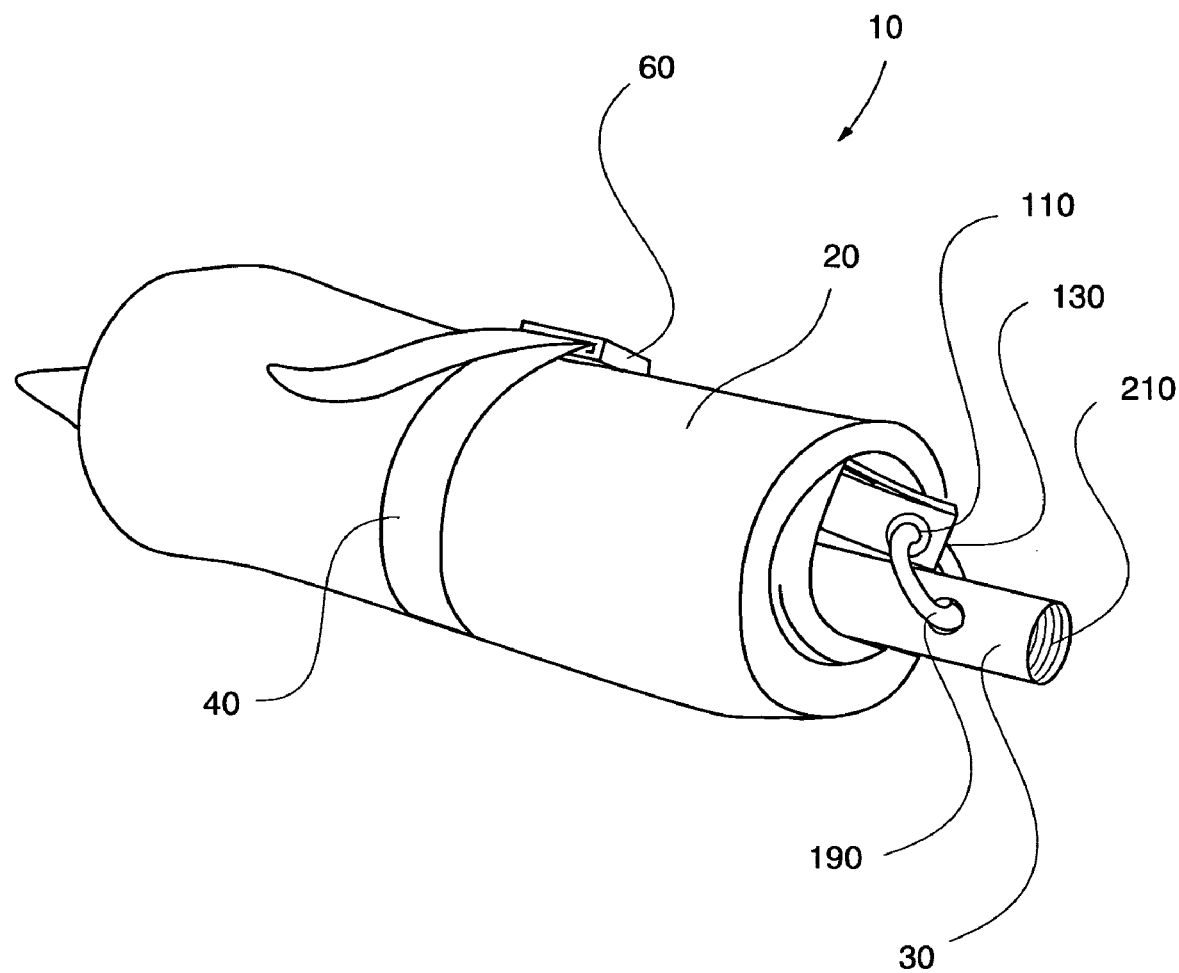

In describing the preferred and selected alternate embodiments of the present invention, as illustrated in FIGS. 1-5, specific terminology is employed for the sake of clarity. The invention, however, is not intended to be limited to the specific terminology so selected, and it is to be understood that each specific element includes all technical equivalents that operate in a similar manner to accomplish similar functions.

Referring now to FIGS. 1-5, the present invention in a preferred embodiment is a portable chair and method of use thereof, wherein portable chair 10 preferably comprises seat 20, support rod 30 and fastening device 40, wherein seat 20 preferably comprises flexible material, such as, for exemplary purposes only, a single sheet of fabric comprised of canvas, other natural fiber and/or man-made fibers.

Fastening device 40 preferably comprises a strap such as belt 50 and fastener 60, wherein fastener 60 preferably comprises a buckle, cambuckle, snap closure, hook-and-loop fastener, or the like. It will be recognized by those skilled in the art that fastening device 40 could comprise a rope that is tied around a tree or pole.

Seat 20 preferably comprises first end 70, second end 80 and middle section 90, wherein first end 70 preferably comprises channel 100 for containment of fastening device 40 therethrough. Second end 80 preferably comprises grommet 110, wherein second end 80 of seat 20 is gathered to point 120, and wherein edge 130 is secured in a fan-folded fashion by grommet 110. Fan folds 135 provide reinforced support and padding to seat 20 at second end 80, providing additional comfort when in use.

Support rod 30 preferably comprises first section 140, second section 150, top end 160 and bottom end 170, wherein first section 140 and second section 150 are preferably telescopically-engaged via locking mechanism 200 to permit lengthening or shortening of support rod 30. Locking mechanism 200 may comprise a compression adjuster, a cam-operated adjuster, or similar device suited for permitting telescoping components to be adjusted. Locking mechanism 200 could alternately comprise spring-loaded buttons or pins 220 disposed within second section 150, wherein spring-loaded buttons/pins 220 engage apertures 230 in first section 140.

Additionally, top end 160 of support rod 30 preferably comprises attachment point 180 and ring fastener 190, wherein ring fastener 190 preferably engages attachment point 180; thereby, securing ring fastener 190 to top end 160. It will be recognized by those skilled in the art that ring fastener 190 could be replaced with a carabiner, chain, or the like.

In use, fastening device 40 is preferably fastened around tree, post or pole T and ring fastener 190 is preferably removably secured to grommet 110. Subsequently, bottom end 170 is preferably disposed proximate base B of tree/post/pole T and first section 140 and second section 150 are preferably adjusted via locking mechanism 200. Accessory 240 is selectively removably secured to support rod 30 via engagement with threads 210, wherein accessory 240 comprises, for exemplary purposes only, a camera, a light or a communications device.

It is envisioned in an alternate embodiment of the present invention that support rod 30 could comprise sections 140 and 150 that fasten together to form a fixed, non-telescopic rod, such as, for exemplary purposes only via threaded connection.

It is further envisioned in an alternate embodiment of the present invention that support rod 30 could comprise more than two sections 140, 150, wherein sections 140, 150 are fastened together telescopically or fixedly.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed is:

1. A method of sitting, wherein said method comprises the steps of:
   a. securing a portable chair to an upright support structure;
   b. extending a support rod proximate a base of the support structure;
   c. wherein said chair comprises fabric material, folding said fabric material into fan-folds; and
   d. securing said fan-folds together via a grommet.

* * * * *